United States Patent [19]

Yamatoh et al.

[11] Patent Number: 4,854,424
[45] Date of Patent: Aug. 8, 1989

[54] PIEZOELECTRIC BRAKE DEVICE

[75] Inventors: Kouhei Yamatoh; Masami Ogura; Katunori Kanbe; Yuji Isogai, all of Saitama, Japan

[73] Assignee: Honda Giken Kogyo Kabushiki Kaisha, Tokyo, Japan

[21] Appl. No.: 182,964

[22] Filed: Apr. 18, 1988

[30] Foreign Application Priority Data

Apr. 17, 1987 [JP] Japan .................. 62-94927
Apr. 17, 1987 [JP] Japan .................. 62-94928

[51] Int. Cl.4 .............. F16D 55/08; B60L 7/00; B60T 8/58; H01L 41/08
[52] U.S. Cl. .................. 188/72.1; 188/158; 303/100; 310/328
[58] Field of Search ............ 303/100; 188/156-161, 188/164, 181 A, 181 C, 72.1, 72.3, 72.6, 72.9, 37 D; 310/328; 192/84 R, 84 A

[56] References Cited

U.S. PATENT DOCUMENTS

| | | | |
|---|---|---|---|
| 3,407,907 | 10/1968 | Schmid | 188/72.6 |
| 3,809,191 | 5/1974 | Woodward | 188/162 X |
| 4,175,645 | 11/1979 | Brinkert | 188/72.1 |
| 4,327,414 | 4/1982 | Klein | 188/158 |
| 4,557,528 | 12/1985 | Leiber | 303/100 X |
| 4,602,702 | 7/1986 | Ohta et al. | 188/71.7 X |
| 4,629,039 | 12/1986 | Imoto et al. | 188/72.3 X |
| 4,658,939 | 4/1987 | Kircher et al. | 188/72.8 X |
| 4,705,323 | 11/1987 | Imoto et al. | 188/72.1 X |
| 4,714,299 | 12/1987 | Takata et al. | 303/100 |
| 4,765,140 | 8/1988 | Imoto et al. | 310/328 X |

FOREIGN PATENT DOCUMENTS

| | | |
|---|---|---|
| 60-81527 | 5/1985 | Japan . |
| 60-139563 | 7/1985 | Japan . |
| 61-180582 | 8/1986 | Japan . |
| 61-191278 | 8/1986 | Japan . |
| 1204376 | 9/1970 | United Kingdom ...... 188/72.6 |

Primary Examiner—Robert J. Oberleitner
Attorney, Agent, or Firm—Lyon & Lyon

[57] ABSTRACT

A brake device for producing a braking force by pressing a friction member against a member to be braked in response to a deformation produced by applying a DC voltage to a piezoelectric element array including a stack of piezoelectric elements. A plurality of piezoelectric element arrays are coupled by a displacement transmission mechanism such that deformations produced by the piezoelectric element arrays are added together.

6 Claims, 3 Drawing Sheets

PIEZOELECTRIC BRAKE DEVICE

BACKGROUND OF THE INVENTION

1. Field of the Invention

The present invention relates to a brake device for pressing a friction member against a member to be braked to produce a braking force in which a deformation of a piezoelectric element is utilized to produce the braking force.

2. Description of the Prior Art

Heretofore, a brake device of the above type has been proposed which includes a single piezoelectric element array of stacked piezoelectric elements, each including a piezoelectric material such as piezoelectric ceramic sandwiched between electrode plates, so arranged that when a DC voltage is applied across each of the piezoelectric elements they produce deformations or strains which are added in the direction of the piezoelectric element array to provide a total amount of deformation that is utilized to press a friction member against a member to be braked, thereby generating a braking force (see Japanese LaidOpen Patent Publication No. 60-81527).

In the brake device of this type, the deformation produced by each piezoelectric element is quite small and, consequently, a lot of piezoelectric elements must be stacked in order to obtain a sufficient braking force, with the result that the piezoelectric array is so long that its space factor is poor.

In order to effectively utilize the deformations of a relatively small number of stacked piezoelectric elements, another brake device has been developed (see Japanese Laid-Open Patent Publication No. 60-139563). In this brake device, until a friction member abuts against a member to be braked, the friction member is caused to slide by a motor-drive actuator in a main braking mode. After the friction member has engaged the member to be braked, an auxiliary braking mode employing the piezoelectric element array is carried out to press the friction member against the member to be braked according to the deformation of the piezoelectric element array for generating desired braking forces.

In the above brake device, however, the brake structure includes two different systems for the main and auxiliary braking modes, respectively, and a control system is required to effect switching from the main braking mode to the auxiliary braking mode. As a consequence, the overall arrangement is complex.

Furthermore, in the case where it is desired to use such a brake device to produce anti-lock braking function whereby pumping brake action is produced to prevent an automobile from skidding due to locked wheels at the time of abruptly braking the automobile, it is required to provide a controller to effect on-off control of a voltage applied to one piezoelectric element array, but in such case the braking force varies for a wide range from zero to a normal level, so that the pumping action of the braking force is rough and it is impossible to produce delicate and highly responsive pumping action with reduced width of variation of the braking force.

It might be possible to effect pumping action, with reduced range of variation of the braking force, by varying the level of the applied voltage in a pulse fashion between a lower voltage value and a normal voltage value, rather than by effecting on-off control of the voltage applied across the piezoelectric array as described above. In such case, however, the voltage applied to the piezoelectric element array should be variable, and control means for variable voltage control would be more complicated than the simple onoff control means.

OBJECT OF THE INVENTION

In view of the aforesaid drawbacks, it is an object of the present invention to provide a brake device including piezoelectric element arrays incorporated therein with a good space factor so that sufficient braking forces can be applied only by the piezoelectric element arrays.

In view of the aforesaid shortcomings, it is another object of the present invention to provide a brake device which utilizes the deformation of piezoelectric elements for pressing a friction member against a member to be braked to produce a braking force, the brake device having an antilock brake capability and being capable of effecting highly responsive pumping action with a simple control means.

SUMMARY OF THE INVENTION

In order to attain the object as described above, the present invention provides a brake device for producing a braking force by pressing a friction member against a member to be braked in response to a deformation produced by applying a DC voltage to a piezoelectric element array including a stack of piezoelectric elements, characterized in that a plurality of piezoelectric arrays are coupled by a displacement transmission mechanism such that deformations produced by the piezoelectric arrays are added together.

In order to attain the object, the present invention further provides a brake device of the above kind in which means are provided for independently controlling voltages applied to the piezoelectric element arrays, and the voltage applied to one or some of the piezoelectirc element arrays is subjected to onoff control to effect pumping control of the braking force.

DESCRIPTION OF THE PREFERED EMBODIMENTS

Embodiments of the present invention will hereinafter be described in detail with reference to the accompanying drawings.

Figure 1:
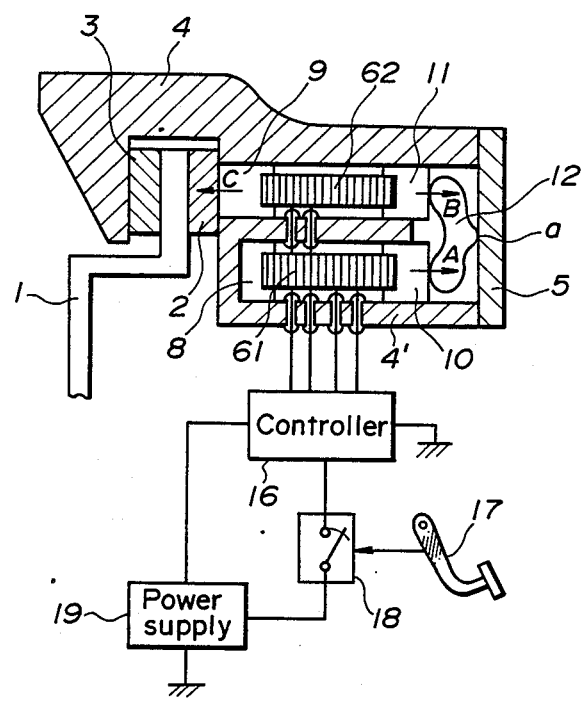
FIG. 1 is a cross-sectional view of a brake device according to an embodiment of the present invention.

FIG. 1 shows an embodiment of the present invention which is applied to a disc-type brake device, which includes a brake pad 2 arranged at one side of a disc rotor 1 of an automobile wheel and a brake pad 3 mounted on a caliper 4, so that the disc rotor 1 is sandwiched between the brake pads 2 and 3 and the brake pad 2 is pressed against one side of the disc rotor to produce braking action.

Two piezoelectric element arrays 61, 62 are disposed in positions parallel to each other and supported on the caliper 4 through a member 4' formed integrally on the caliper. One of the piezoelectric element arrays 61 is fixed at its one end on said member 4' through a holding member 8, while the other piezoelectric element array 62 is attached at its end corresponding to the above-mentioned end of the piezoelectric element array 61, with the brake pad 2 through a holding member 9.

The other ends of the piezoelectric arrays 61, 62 are held by respective holding members 10, 11 which are interconnected by a link 12.

Figure 2:
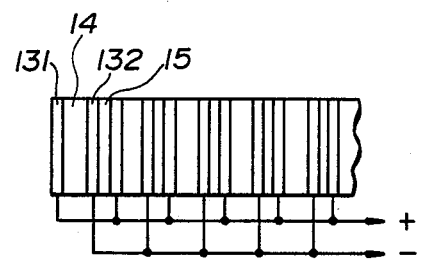
FIG. 2 is an enlarged fragmentary view of a piezoelectric element array in the brake device.

As shown in FIG. 2, each of the piezoelectric element arrays 61, 62 has a stack of piezoelectric elements each comprising a piezoelectric material 14 such as piezoelectric ceramic sandwiched between positive and negative electrode plates 131, 132, with insulating plates 15 being interposed
between adjacent peizoelectric elements The holding member 10 on the other end of the piezoelectric element array 61 is free with respect to the member 4' on the side of the caliper 4. In response to displacement of the piezoelectric element array 61 due to strain in the direction of the stack thereof, the holding member 10 is caused to slide in the direction indicated by the arrow A, while being guided by the member 4'.

The holding members 9, 11 on the opposite ends of the piezoelectric element array 62 are also free with respect to the member 4' on the caliper 4. The holding members 9, 11 and the piezoelectric element array 62 are slidable in the directions of the arrows B, C while being guided by the caliper 4 and the member 4'

The link 12 is substantially in the shape of a V and inserted between a support member 5 and the piezoelectric element arrays 61, 62 so that it can be angularly moved like a seesaw about a pivot a at the bent end thereof. When the piezoelectric element array 61 is deformed to move the holding member 10 in the direction of the arrow A, one end of the link 12 is pushed to turn the link 12 which enables the other end thereof to push the holder 11 on the piezoelectric element array 62 in the direction of the arrow C.

A controller 16 reads a signal from a potentiometer 18 which is indicative of the amount of depression of a brake pedal 17. The controller 16 then applies DC voltages, determined under control to produce braking forces dependent on the amount of depression of the brake pedal 17, respectively to the piezoelectric element arrays 61, 62. Denoted at 19 is a power supply.

In operation, when the brake pedal 17 is depressed, the controller 16 applies DC voltages dependent on the amount of depression of the brake pedal 17 to the piezoelectric element arrays 61, 62, respectively. The produced deformations of the piezoelectric element arrays 61, 62 are applied in series to the brake pad 2 through the link 12 to push the brake pad 2 in the direction of the arrow C. The brake pads 2, 3 now impose given braking forces on the disc rotor 1.

According to the present invention, as described above, the piezoelectric element array including a stack of a plurality of piezoelectric elements to obtain a required braking force is divided into at least two piezoelectric element arrays 61 and 62, which are disposed in parallel relationship with each other, and these arrays are so arranged that the braking forces produced due to the deformations of the piezoelectric element arrays 61, 62 are applied in series to the brake pad 2 through the link 12. Thus the piezoelectric element arrays 61, 62 for producing braking forces are accommodated in the brake device with a good space factor.

Where the arms of the substantialy V-shaped link 12 are of equal lengths, the deformation of the piezoelectric element array 61 is simply transmitted to the piezoelectric element array 62. However, the arm of the link 12 which is coupled to the piezoelectric element array 62 may be longer than the other arm for amplifying the deformation of the piezoelectric element array 61 and transmitting the amplified deformation to the piezoelectric element array 62.

Figure 3:
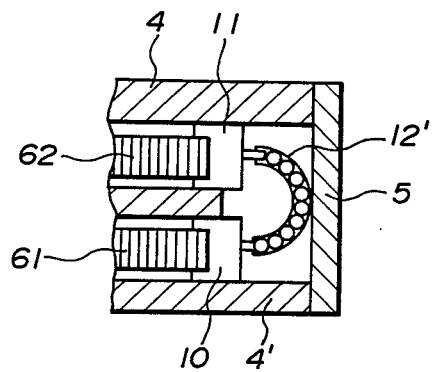
FIG. 3 is a cross-sectional view of another displacement transmission mechanism.

If the deformation of the piezoelectric element array 61 is to be simply transmitted to the piezoelectric element array 62, then a ball-type transmission mechanism 12' as shown in FIG. 3 or other hydraulic transmission mechanisms may be employed as a displacement transmission mechanism instead of the link 12.

Figure 4:
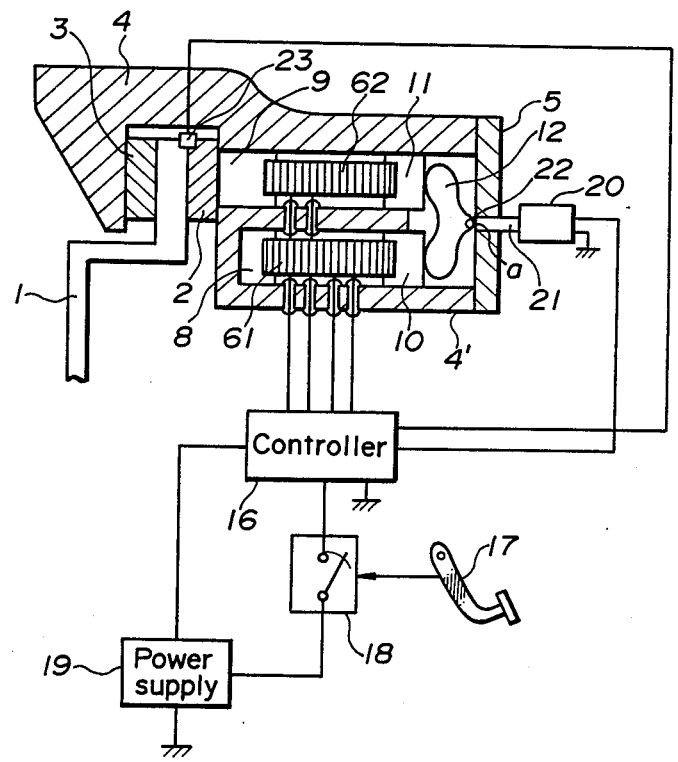
FIG. 4 is a cross-sectional view of a brake device according to another embodiment of the present invention.

FIG. 4 shows another embodiment of the present invention, in which a link 12 has a pivot a which is attached to the distal end of an extensible/contractable output shaft 21 of actuator 20 by a ball joint 22 so that the link 12 is angularly movable like a seesaw. According to this construction, when clearances which normally exist between the brake pads 2 and 3 and the disc rotor 1 at the time of nobraking are increased owing to wearing of said brake pads and/or disc rotor, the actuator 20 is operated to extend the output shaft 21 to vary relative positions of the parallel piezoelectric element arrays 61, 62 to adjust the clearances to predetermined values. When the output shaft 21 of the actuator 20 is extended, only the piezoelectric element array 62 is pushed through the link 12 in the direction of the array C to move the brake pad 2 toward the disc rotor 1. When the actuator 20 is not operated, the output shaft 21 is held in a previously operated position.

The actuator 20 may be operated as follows: The actual clamping force between the brake pad 2 and the disc rotor 1 in braking operation is detected by a sensor 23. The brake pad 2 is retracted by the actuator 20 by a predetermined interval from the position in which a predetermined clamping force is obtained, thereby holding a desired clearance. Alternatively, the actuator 20 may be operated manually by visually checking the actual clearance.

The clearances between the brake pads 2, 3 and the disc rotor 1, even if they are worn, can be kept at an optimum level at all times by such a clearance adjusting means. Thus, predetermined braking forces dependent on the amount of depression of the brake pedal 17 can be maintained.

Figure 5:
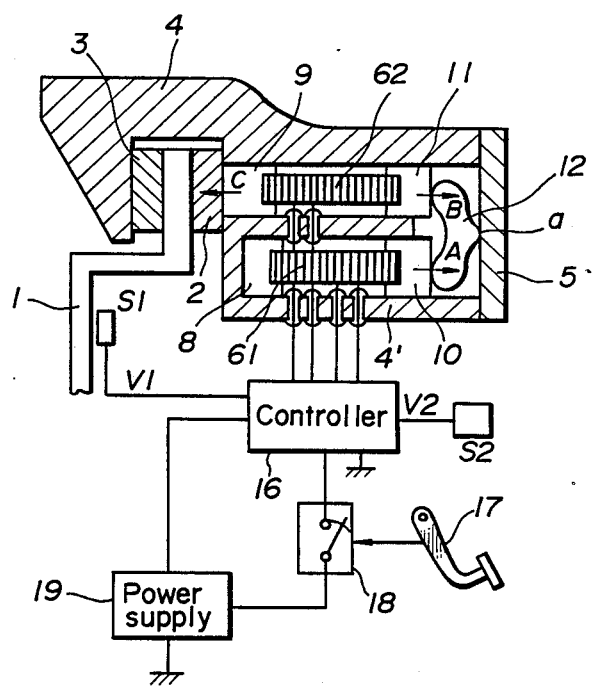
FIG. 5 is a cross-sectional view of a brake device according to a further embodiment of the present invention.

FIG. 5 shows a further embodiment of the present invention, which includes a rotation sensor S1 for detecting number of rotation of a disc rotor 1 and a speed sensor S2 for detecting speed of the automobile. A controller 16 reads output signals V1, V2 of the sensors S1, S2, respectively, and determines a slip rate from a predetermined formula (V2−V1)/V2. If the determined slip rate is higher than a preset threshold, then the controller 16 determines that the automobile is skidding.

The controller 16 serves to input a signal of a potentiometer 18 which detects the depth to which a brake pedal 17 is depressed, and said controller applies DC voltages, determined under programmed control to produce braking forces dependent on the amount of depression of the brake pedal 17, independently to the piezoelectric element arrays 61, 62. The controller 16 also effects pumping brake control to turn on and off only the piezoelectric element array 62.

When a skidding condition of the automobile is detected by the controller 16, based on the output signals from the rotation sensor S1 and the speed sensor S2, such as upon abrupt braking, the controller 16 keeps on applying the voltage to the piezoelectric element aray 61 and repeatedly quickly turns on and off the voltage applied to other piezoelectric element array 62 for pumping brake action until the braking operation caused by depressing the brake pedal 17 is cut off.

Figure 6:
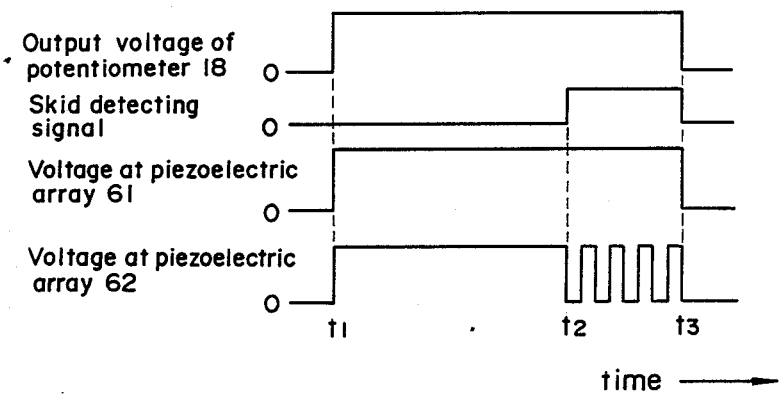
FIG. 6 is a timing chart of signals produced during operation of the brake device.

FIG. 6 shows a timing chart of signals produced during operation of the brake device. In FIG. 6, t1 indicates the time when the braking operation is started, t2 the time when a skidding condition is detected, and t3 the time when the braking operation is terminated.

By thus controlling the voltages applied to the peizoelectric element arrays 61, 62 while the skidding condition is being detected, a precise, highly responsive pumping action with less variable braking forces is achieved. Such pumping control is simple since only the voltage applied to the piezoelectric element array 62 is required to be turned on and off.

In the case where the numbers of stacked piezoelectric elements of the piezoelectric element arrays 61 and 62 are the same and voltages of the same magnitude are applied to the peizoelectric element arrays 61, 62 during braking operation, the braking forces will vary between a normal level and a level which is ½ of the normal level during pumping brake action. In case the numbers of stacked piezoelectric elements of the piezoelectric element arrays 61, 62 are different, the magnitudes of voltages applied to the piezoelectric element arrays 61, 62 are appropriately selected, and the voltage applied to the piezoelectric element array 61 is turned on and off, then more precise pumping control may be accomplished.

The brake device of the present invention is not limited to the illustrated embodiment in which two piezoelectric element arrays are disposed parallel to each other. Three piezoelectric element arrays, for example, may be disposed parallel to each other, and may be coupled by displacement transmission mechanisms such as two links so that the deformations of the piezoelectric element arrays will be applied in series. Thus, two or more piezoelectric element arrays may be disposed parallel to each other, and the voltage or voltages applied to one or some of the piezoelectric element arrays may independently be turned on and off. Moreover, rather than a plurality of parallel piezoelectric element arrays, a series of piezoelectric arrays may be employed which may be coupled by a linear displacement transmission mechanism or mechanisms.

It will be understood from the above description that the present invention provides a brake device in which a plurality of piezoelectric element arrays are incorporated parallel to each other in the device, and coupled by a displacement transmission mechanism such that braking forces due to the deformations of the piezoelectric element arrays will be applied in series to a friction member. Accordingly, the piezoelectric element arrays each comprising many stacked peizoelectric devices can be assembled in the device with a good space factor. Sufficient braking forces can be applied to a braked member only from the deformations of the piezoelectric element arrays.

Further, the present invention provides a brake device in which a plurality of piezoelectric arrays are coupled by a displacement transmission mechanism such that the deformations of the piezoelectric arrays will be added, and means is provided for independently controlling voltages applied to the piezoelectric arrays. Therefore, highly responsive, optimum pumping brake action can be achieved under simple control.

We claim:

1. A brake device including a piezoelectric element array havng a stack of a plurality of piezoelectric elements which act to press a friction member against a member to be braked, under the action of a deformation of said piezoelectric element aray caused by applying DC voltage thereto, thereby producing a braking force, said brake device comprising a plurality of piezoelectric element arrays which are arranged in a parallel relationship with each other and are connected together by a displacement transmitting mechanism so that the deformations of the respective piezoelectric element arrays are added together to produce the braking force.

2. A brake device according to claim 1, comprising at least two piezoelectric element arrays arranged in parallel relationship with each other, in which one end of one of said piezoelectric element arrays is fixed and one end of the other piezoelectric element array at the side corresponding to the above mentioned one end of the one piezoelectric element array is attached with said friction member, and in which the other ends of the respective piezoelectric element arrays are connected together by means of said displacement transmitting mechanism.

3. A brake device according to claim 2 in which means are provided to adjust relative position of the respective piezoelectric element arrays, which are arranged in parallel relationship, by moving said displacement transmitting mechanism.

4. A brake device according to claim 1, in which said displacement transmitting mechanism consists of a link transmission mechanism.

5. A brake device according to claim 1, including means for detecting a skid state of an automobile and means for effecting pumping control of the brake device when the skid state is detected by causeing on-off control of voltage applied to at least one of the respective piezoelectric element arrays.

6. A brake device according to claim 1, which includes means for effecting voltage control of the respective piezoelectric elements independently from each other.

* * * * *